United States Patent
McNutt

(10) Patent No.: US 9,513,817 B2
(45) Date of Patent: *Dec. 6, 2016

(54) FREE SPACE COLLECTION IN LOG STRUCTURED STORAGE SYSTEMS

(71) Applicant: INTERNATIONAL BUSINESS MACHINES CORPORATION, Armonk, NY (US)

(72) Inventor: Bruce McNutt, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/160,019

(22) Filed: May 20, 2016

(65) Prior Publication Data

US 2016/0266815 A1 Sep. 15, 2016

Related U.S. Application Data

(63) Continuation of application No. 13/604,711, filed on Sep. 6, 2012, now Pat. No. 9,372,751.

(51) Int. Cl.

| | |
|---|---|
| *G06F 12/00* | (2006.01) |
| *G06F 17/30* | (2006.01) |
| *G06F 3/06* | (2006.01) |
| *G06F 12/12* | (2016.01) |
| *G06F 12/08* | (2016.01) |

(52) U.S. Cl.
CPC .......... *G06F 3/0611* (2013.01); *G06F 3/0619* (2013.01); *G06F 3/0665* (2013.01); *G06F 3/0689* (2013.01); *G06F 12/0833* (2013.01); *G06F 12/128* (2013.01); *G06F 2212/621* (2013.01); *G06F 2212/69* (2013.01)

(58) Field of Classification Search
CPC .... G06F 11/1076; G06F 3/0689; G06F 3/061; G06F 3/0652
USPC .......... 707/813, 814, 819, 999.202, 999.206; 711/113, 114, 160, 165, 170
See application file for complete search history.

(56) References Cited

U.S. PATENT DOCUMENTS

| | | |
|---|---|---|
| 5,933,840 A | 8/1999 | Menon et al. |
| 6,968,351 B2 | 11/2005 | Butterworth |
| 8,788,778 B1 | 7/2014 | Boyle |

(Continued)

OTHER PUBLICATIONS

Gupta et al. "DFTL: A Flash Translation Layer Employing Demand-based Selective Caching of Page-level Address Mappings", Pennsylvania State University, University Park, PA, 2009, pp. 229-240.

(Continued)

*Primary Examiner* — Md. I Uddin
(74) *Attorney, Agent, or Firm* — David Zwick

(57) ABSTRACT

Free space collection in a log structured storage system. In response to receiving a request to collect free space, the segment in a recently invalidated segment list having the largest cumulative sum of invalidation duration values is selected for free space collection if this cumulative sum is larger than the cumulative sum of invalidation duration values for the segment in a stable segment list having the largest cumulative sum of invalidation duration values. Otherwise, the segment in the stable segment list having the largest cumulative sum of invalidation duration values is selected for free space collection. emptying. The selected segments are then emptied and become available for the writing of data to their tracks.

3 Claims, 8 Drawing Sheets

(56) References Cited

U.S. PATENT DOCUMENTS

| | | |
|---|---|---|
| 2002/0032835 A1 | 3/2002 | Li et al. |
| 2002/0087822 A1* | 7/2002 | Butterworth .......... G06F 3/0608 |
| | | 711/170 |
| 2012/0030021 A1 | 2/2012 | Gupta et al. |
| 2013/0254459 A1* | 9/2013 | Laplace .............. G06F 9/45533 |
| | | 711/103 |
| 2014/0068219 A1 | 3/2014 | McNutt |

OTHER PUBLICATIONS

Menon et al. "An Age-Threshold Algorithm for Garbage Collection in Log-Structured Arrays and File Systems", IBM Research Division, Almaden Research Center, San Jose, CA, pp. 1-43.

Debnath et al., "Sampling-based Metadata Management for Flash Storage", University of Minnesota, Twin Cities, MN, pp. 1-14.

* cited by examiner

FREE SPACE COLLECTION IN LOG STRUCTURED STORAGE SYSTEMS

BACKGROUND

The disclosure relates generally to information storage systems, and more specifically to improved free space collection in log structured storage systems.

Log structured storage systems have been developed as a form of disk storage management to improve disk access time. LFSs use the assumption that files are cached in a main memory and that increasing memory sizes will make the caches more effective at responding to read requests. As a result, disk use is dominated by writes. A LFS writes all new information to disk in a sequential structure called a log. New information is stored at the end of the log rather than updated in place, to reduce disk seek activity. As information is updated, portions of data records at intermediate locations of the log become outdated. This approach increases write performance by eliminating almost all seeks. The sequential nature of the log also permits faster crash recovery.

In a LFS, data is stored permanently in the log and there is no other structure on disk. For a LFS to operate efficiently, it must ensure that there are always large extents of free space available for writing new data.

Log structured disks (LSD) and log structured arrays (LSA) are disk architectures which use the same approach as the LFS. LSAs combine the LFS architecture and a disk array architecture such as the well-known RAID (redundant arrays of inexpensive disks) architecture with a parity technique to improve reliability and availability. Generally, an LSA includes an array of N+1 physical discs and a program that manages information storage to write updated data into new disk locations rather than writing new data in place. Therefore, the LSA keeps a directory which it uses to locate data items in the array.

As an illustration of the N+1 physical disks of the LSA array, an LSA system may include a group of disk drive DASDs (direct access storage devices), each of which includes multiple disk platters stacked into a column. Each disk is divided into large consecutive areas called segment-columns. A segment-column is typically as large as a physical cylinder on a physical disk. Corresponding segment-columns from the N+1 disks constitute a segment. The array has as many segments as there are segment-columns on a disk in the array.

A logical track is stored entirely within some segment-column of some physical disk of the array; many logical tracks can be stored in the same segment-column. The location of a logical track in an LSA changes over time. A directory, called the LSA directory, indicates the current location of each logical track. The size of a logical track is such that many logical tracks can be stored in the same LSA segment-column.

In LSAs and LFSs, data to be written is grouped together into relatively large blocks (the segments) which are written out as a unit in a convenient free segment location on disk. When data is written, the previous disk locations of the data become free creating unused data (or garbage) in the segments on disk. Eventually the disk fills up with segments and it may be necessary to create free segment locations by reading source segments containing at least some unused data and compacting their still-in-use content into a lesser number of destination segments without any unused data. This process is called free space (or garbage) collection.

To ensure that there is always an empty segment to write to, all logical tracks from a segment selected for free space collection that are still in that segment (i.e. are still pointed to by the LSA directory) are typically read from disk and placed in a memory segment. These logical tracks will be written back to disk when the memory segment fills. Free space collected segments are returned to the empty segment pool and are available when needed.

As free space collection proceeds, live data from the various target segments is read into the temporary storage buffer, the buffer fills up, and the live data is stored back into an empty segment of the disk array. After the live data in the temporary storage buffer is written back into the disk array, the segments from which the live data values were read are designated as being empty. In this way, live data is consolidated into a fewer number of completely full segments and new empty segments are created. Typically, free space collection is performed when the number of empty segments in the array drops below a predetermined threshold value.

The way in which target segments are selected for the free space collection process affects the efficiency of LSA system operation. There are three well-known in the art algorithms that may be used: "greedy" algorithm, "cost-benefit" algorithm, and "age-threshold" algorithm. The greedy algorithm selects target segments by determining how much free space will be achieved for each segment processed and then processing segments in the order that will yield the most amount of free space. The cost-benefit algorithm compares a cost associated with processing each segment against a benefit and selects segments for processing based on the best comparisons. The age-threshold algorithm selects segments for processing only if their age in the storage system exceeds an age-threshold value and once past the age-threshold, the segments are selected in the order of leased utilized segments first.

More particularly, in the cost-benefit algorithm, a target segment is selected based on how much free space is available in the segment and how much time has elapsed since the segment was last filled with new information. The elapsed time is referred to as the age of the segment. In the cost-benefit algorithm, the age of the segment is defined to be the age of the youngest live track in the segment. For example, age might be indicated by a time stamp value associated with a track when it is placed in the LSA input write buffer. A benefit-to-cost ratio is calculated for each segment, such that the ratio is defined to be:

$$\text{Benefit/Cost} = (1-u)a/(1+u)$$

where u is called the utilization of the segment; (1−u) is defined to be the fraction amount of free space in the segment, also called the "dead" fraction; and a is the age of the segment as defined above.

In the age-threshold algorithm, segments are selected if their age exceeds a threshold value. The system determines the age of a segment by determining the amount of time a segment has been located in the storage system and considers a segment for free space collection only after the segment has been located in the storage system for the selected age threshold value. From the set of candidate segments, the system chooses one or more segments for free space collection in the order that they will yield the most free space. The free space yield is determined by utilization data, so that the least utilized segments will be free space collected first.

SUMMARY

Embodiments of the present invention disclose a method, computer program product, and system for free space collection in a log structured storage system having segments, each segment including a plurality of tracks. In response to initially writing data to all the tracks of an empty one of the segments, an entry is added for the one segment to a stable segment list, the entry including a collection score value of zero. In response to invalidating a track in one of the segments to which data has been written, an entry is added for the invalidated track to an invalidated track list (ITL); the segment is removed from the stable segment list, if it is in the stable segment list, and an entry is added for the segment to a recently invalidated segment list, if such an entry is not in the recently invalidated segment list. A collection score value is periodically determined for each segment with a track in the ITL by calculating a cumulative sum of invalidation duration values corresponding to the durations that tracks belonging to the segment have remained on the ITL. In response to determining that the collection score value for a track in the ITL is greater than a predetermined collection score threshold value, the collection score is set to the collection score threshold value and the track is removed from the ITL. In response to determining that a segment in the recently invalidated segment list has no associated tracks in the ITL, the segment is moved from the recently invalidated segment list to the stable segment list. In response to receiving a request to collect free space in the log structured storage system, the segment in the recently invalidated segment list having the largest cumulative sum of invalidation duration values is selected for free space collection if this cumulative sum is larger than the cumulative sum of invalidation duration values for the segment in the stable segment list having the largest cumulative sum of invalidation duration values. Otherwise, the segment in the stable segment list having the largest cumulative sum of invalidation duration values is selected for free space collection. emptying. The selected segments are then emptied and become available for the writing of data to their tracks.

DETAILED DESCRIPTION

Embodiments of the present invention will now be described with reference to the figures. Embodiments of the present invention apply equally to all forms of log structured storage systems including LSD, LSA and LSF systems. However, focus is directed to LSAs by means of example and explanation in the description of embodiments of the present invention.

The method of free space collection described herein using a collection score criterion achieves good efficiency. In accordance with an embodiment of the present invention, the collection score value represents a sum, across tracks in the segment, of the amount of time over a predetermined period of time during which the track has been invalid due to a more recent copy being written in a different segment. By identifying segments for collection in a manner that reflects the time sensitive nature of invalidation, various embodiments of the present invention enable one to enhance collection efficiency and avoid the drawback of prior art algorithms of collecting old segments that contain relatively small amounts of invalid data even though there have been no recent changes to that segment. The free space collection approach described herein defers collection of new segments due to the higher likelihood of invalidation, while older segments are allowed to remain stable if no further invalidation occurs.

Figure 1:
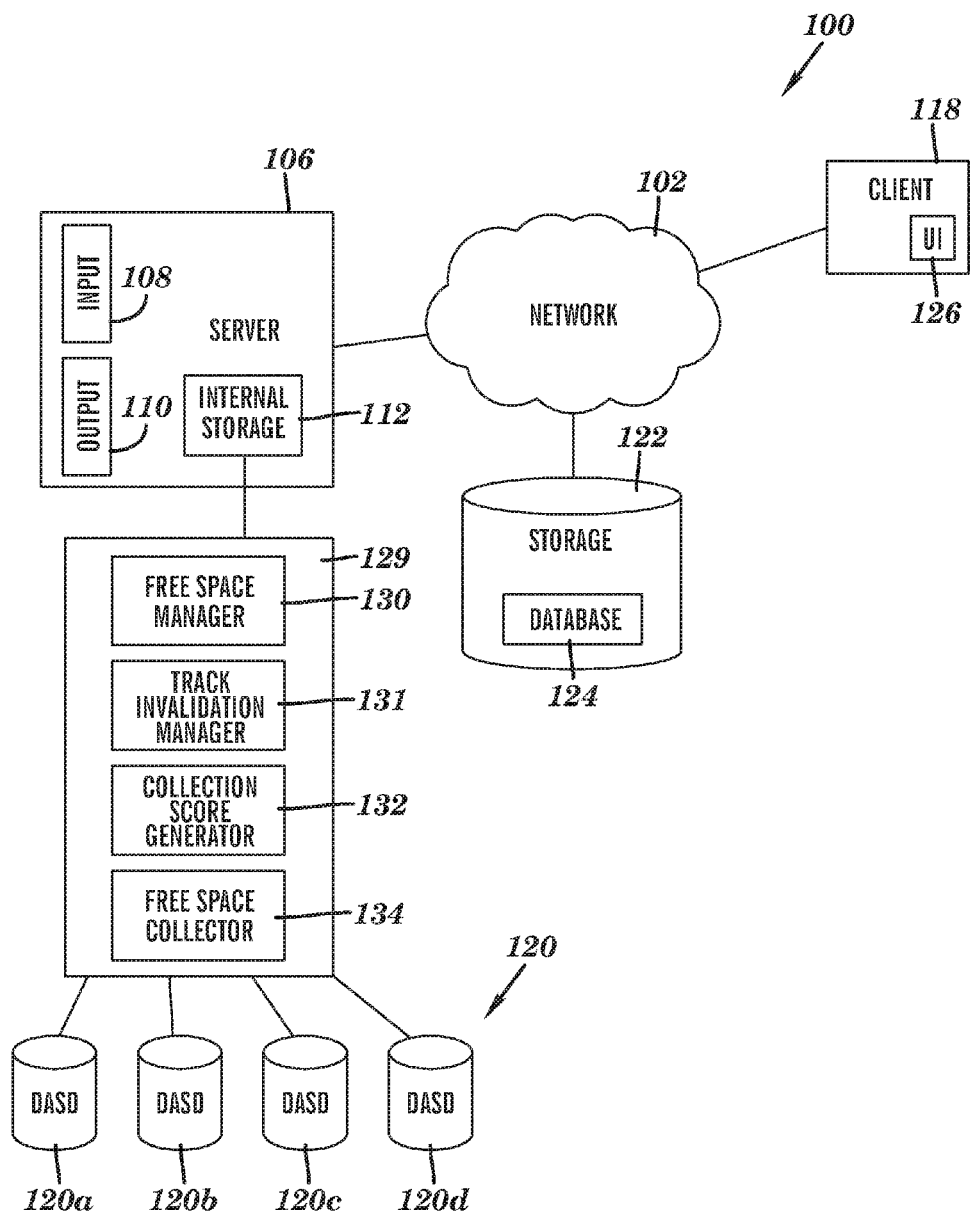
FIG. 1 is a block diagram of a sample computer environment in which an embodiment of the present invention can be implemented.

FIG. 1 is a conceptual block diagram of a sample computer environment in which an embodiment of the present invention can be implemented. FIG. 1 is an illustration of one implementation and is not intended to imply any limitation with regard to the environments in which different embodiments may be implemented. Many modifications to the depicted environments may be made.

In one embodiment network 102 can be the Internet which uses the TCP/IP suite of protocols. Network 102 may also comprise a number of different types of networks, such as an intranet, a local area network (LAN), a wide area network (WAN), wireless local area network (WLAN), synchronous optical network (SONET), and the like.

Network 102 provides communication links between various devices and computers. Network 102 may include connections, such as wire, wireless communication links, fiber optic cables, or any other connection technology known in the art. Network 102 may include additional server computers, client computers, displays and other devices not shown.

The exemplary computer environment 100 comprises server computer 106 coupled to client computer 118 and storage unit 122 via network 102. As will be discussed with reference to FIG. 8, server computer 106 includes internal components 800a and external components 900a and client computer 118 includes internal components 800b and external components 900b. Internal components 800a of sever computer 106 include, but not limited to, one or more processors 820 (shown in FIG. 8).

Server computer 106 connects to network 102. Server computer 106 may be a workstation, a mainframe computer, a personal computer, and the like. Server computer 106 is configured to communicate with an external storage system 120. In an embodiment, storage system 120 may include N+1 direct access storage devices (DASD) in which information is maintained as a log structured array (LSA). In FIG. 1, an array 120 including four DASDs 120a, 120b, 120c, 120d is shown for illustration, but it should be understood that the DASD array may include a greater or lesser number of DASD. A control unit program 129 controls the storage of information so that the DASD array 120 is maintained as an LSA. Thus, the DASD recording area is divided into multiple segment-column areas and all like segment-columns from all the DASDs collectively include one segment's worth of data. The control unit program 129 manages the transfer of data to and from the DASD array 120 so that periodically it considers segments for free space and selects target segments according to a collection score described in detail below.

In an embodiment, control unit program 129 may comprise program instructions stored on one or more computer-readable tangible storage devices, which may include internal storage 112 on server computer 106. Control unit program 129 may communicate via local and/or remote processes, such as in accordance with a signal having one or more data packet (for example, but not limited to, data from one program interacting with another program in a local system, distributed system, and/or across network 102 with other systems via the signal). Data gathered, generated, and maintained for use by control unit program 129 may be kept in internal storage 112 of server computer 106 or in one or more databases 124 of storage unit 122.

In an embodiment, control unit program 129 may include various programs or program components, such as free space manager 130, track invalidation manager 131, collection score generator 132, and free space collector 134. Free space manager 130 may be, for example, a computer program or program component for managing free space in DASD array 120 as discussed in conjunction with FIG. 4. Track invalidation manager 131 may be, for example, a computer program or program component for controlling data track invalidation process as discussed in conjunction with FIG. 5. Collection score generator 132 may be, for example, a computer program or program component capable of generating a collection score value for a plurality of segments managed by control unit program 129 as discussed in conjunction with FIG. 6. Free space collector 134 may be, for example, a computer program or program component for controlling free space collection in DASD array 120 as discussed in conjunction with FIG. 7. Free space manager 130, track invalidation manager 131, collection score generator 132, and free space collector 134 reside within control unit program 129 and may be localized on server 106 and/or distributed between two or more servers.

Client computer 118 also connects to network 102. Client computer 118 may be, for example, a mobile device, telephone, television receiver, cell phone, personal digital assistant, netbook, laptop computer, tablet computer, desktop computer, and/or any type of computing devices capable of executing software in accordance with the embodiments described herein. Client computer 118 may contain user interface (UI) 126. UI 126 can be, for example, graphical user interface (GUI) or web user interfaces (WUI). Client computer 118 may receive, process, display and/or otherwise render data contained within external storage system 120.

Figure 2:
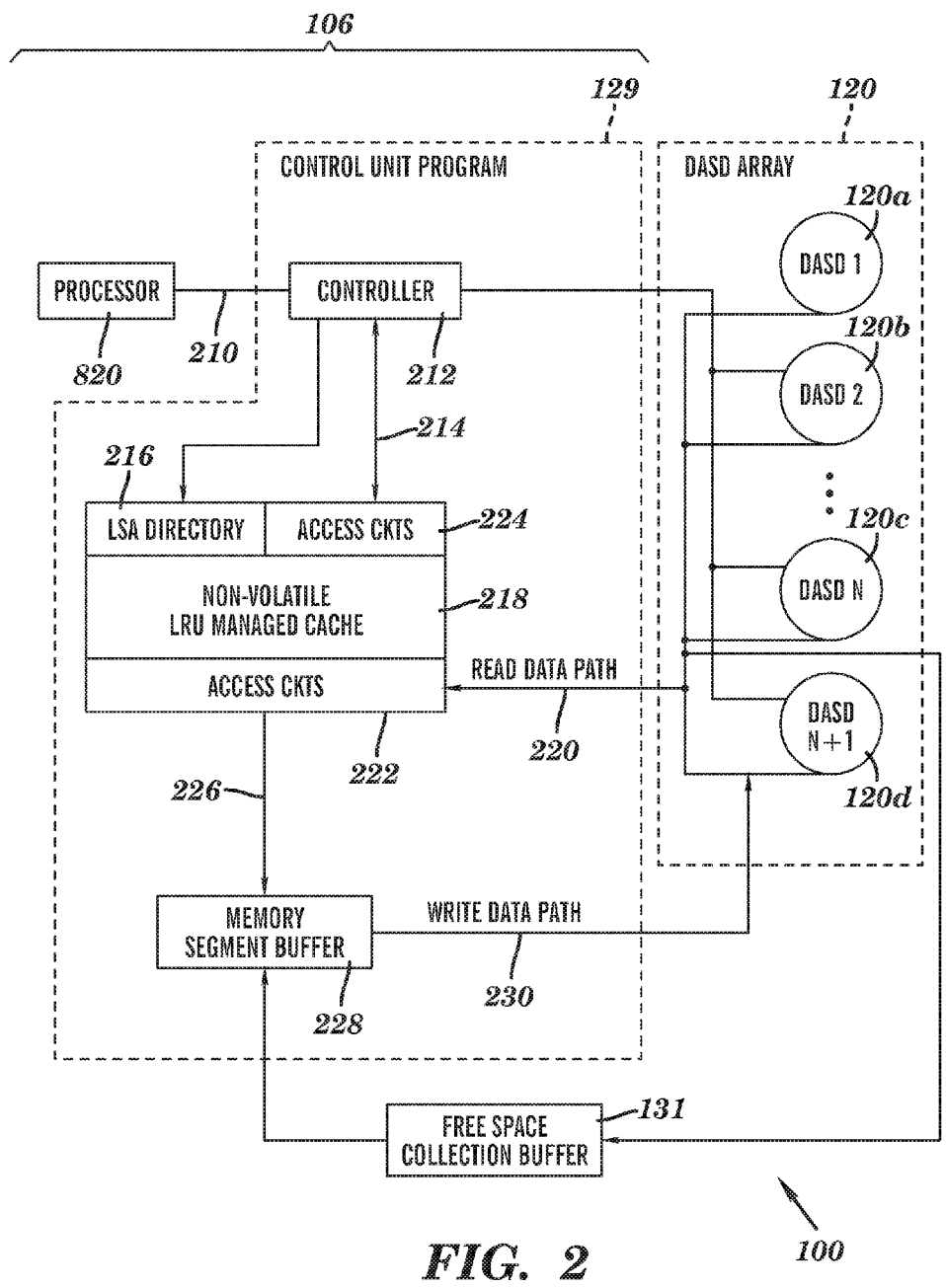
FIG. 2 is a representation of a computer server illustrated in FIG. 1 constructed in accordance with an embodiment of the present invention.

Referring to FIG. 2, FIG. 2 illustrates operation of a computer server illustrated in FIG. 1 in more detail. Typically, an application program executing in server 106 and/or client 118 may generate a request to read or write data, which causes operating system 828 (shown in FIG. 8) to issue a read or write request, respectively to the control unit program 129.

When one or more processors 820 issues a read or write request, the request is sent from one or more processors 820 to control unit program 129 over a data bus 210 and may be received within control unit program 129 by, for example, a controller program 212. Controller program 212 may be, for example, a computer program or program component of control unit program 129 for interpreting read and write requests in accordance with an embodiment of the invention.

In response to receiving a read or write request, controller program 212 may produce control signals and provide them over a controller data path 214 to an LSA directory 216 and thereby may determine where in the LSA data is located, either in a non-volatile LSA data cache 218 or in the DASD array 120.

Data may be transferred between the one or more processors 820 and DASD storage devices 120a, 120b, 120c, and 120d during read operations over a path including a read data path 220, DASD access circuits 222, the LSA data cache 218, controller access circuits 224, the controller data path 214, and the data bus 210. Data may be transferred during write operations over a path including the data bus 210, the controller data path 214, the controller access circuits 224, the LSA data cache 218, the DASD access circuits 222, a segment data path 226, an accumulating memory segment input write buffer 228, and a DASD write path 230.

In an embodiment, the LSA data cache 218 may be managed as a least-recently-used cache, so that data is queued in the cache, with the most recently stored data at the top (or front) of the queue.

A basic operation of the control unit program 129 is to write a particular track so as to change the contents of the track. In general, control unit program 129 may first place such live tracks in the non-volatile data cache memory 218 of the control unit program 129. When the fraction of the cache occupied by modified tracks exceeds a predetermined value, the control unit program 129 may logically move a set number of modified tracks to the memory segment 228 by assigning them there. After one segment's worth of live tracks are moved into the memory segment, the control unit program 129 may write the live tracks into contiguous locations of the DASD array 120. It should be understood that the operation of the data cache 218 is transparent to the one or more processors 820 and therefore some operations of the storage system will be described from the perspective of the processor, without reference to the data cache. Although, the inclusion of data cache 218 as described above can improve the overall performance of an LSA storage system, it should be understood the inclusion of a data cache and the details of its implementation are not essential to the various embodiments of the invention.

According to an embodiment of the invention, the smallest unit of data that can be written by the processor 820 is called a track, and a predetermined number of tracks comprise a segment. At any time, a track is live, or current, in only one segment. In all other segments, the track is outdated, also referred to as being a dead track. As used herein, the term "valid data" refers to a plurality of live tracks in a plurality of storage segments. As used herein, the term "invalid data" refers to a plurality of outdated (or invalid) tracks in a plurality of storage segments.

If the control unit program 129 writes a track, for example k, into the segment, for example so and if the track k was previously valid in some other DASD segment Si in the DASD array 120, then the track k becomes invalid in the segment Si and becomes valid in the control unit program's 129 segment so being filled. This continues until control unit program 129 fills the segment so to capacity, at which time control unit program 129 destages the segment so, meaning that it moves the segment so from the memory segment buffer 228 and writes to the DASD array 120. Control unit program 129 then fills another segment's worth of data in the memory segment buffer 228 and repeats the process until the next destage operation.

As data writing proceeds from LSA data cache memory to DASD in this manner, the DASD storage in the LSA becomes fragmented. That is, after several sequences of destaging operations, there can be many DASD segments that are only partially filled with valid data (live tracks) and otherwise include invalid data (dead tracks). This affects an LSA operating statistic referred to as utilization.

The writing process described immediately above will eventually deplete the empty segments in the DASD array 120. Therefore, a free space collection process (described further below) may be performed to create empty segments. Control unit program 129 may carry out free space collection by selecting a certain number of partially-filled target segments in DASD and compacting the live tracks in these segments into a fewer number of full segments, thereby creating empty segments. For example, if control unit program 129 performs free space collection on three partially empty segments, and each has a 2/3 utilization rate, then the valid tracks can be collected and reorganized into two full segments and one completely empty segment that is ready to receive data from the LSA input buffer 228. Thus, the control unit program 129 creates a net increase of one empty segment by the free space collection process. The free space collection process is typically a low priority, background process and may be carried out periodically by the control unit program 129.

The control unit program 129 may include program instructions that emulate one or more logical devices so that the physical nature of the external storage system (the DASD array 120) is transparent to the one or more processors 820. Thus, the control unit program 129 may interpret and carry out read and write requests sent from the one or more processors 820 in a manner that is otherwise not transparent to the one or more processors 820. In this way, the control unit program 129 may map one or more logical (virtual) devices onto the actual DASDs of the array 120.

Because, the control unit program 129 maintains the stored data as an LSA, one or more logical tracks can be stored entirely within a segment-column of one of the DASDs 120a, 120b, 120c, 120d. Over time, the location of a logical track in the DASD array 120 can change. In an embodiment of the invention, the LSA directory 216 may have an entry for each logical track, to indicate the current DASD location of each logical track. Each LSA directory entry for a logical track may include the logical track number, the actual DASD drive number and segment-column number within the DASD, the starting sector within the column at which the logical track starts, and the length of the logical track in sectors.

When the control unit program 129 receives a read request for data in a logical track, it determines the logical track in which the data is stored, examines the LSA directory 216, and determines the DASD number, starting sector, and length in sectors to which the logical track is currently mapped. The control unit program 129 then reads the relevant sectors from the corresponding DASD unit of the N+1 units in the array 120. When it receives a write request, the control unit program 129 first accumulates the data to be written in the memory segment buffer 228, which can store N+1 segment-columns to form one complete segment. Each segment includes N segments-columns of data and one segment-column of parity data. When the memory segment is full, the control unit program 129 writes the N+1 segment-columns to an empty segment in the DASD array 120, and updates the LSA directory entries for all logical tracks that were written to DASD from the memory segment to reflect the new DASD locations.

Because of the updating and deletion of logical tracks, gaps in the DASD segments occur. Therefore, to ensure that an empty segment is always available in the DASD array 120, the control unit program 129 periodically performs the free space collection process on segments in the LSA. In the free space collection process, generally, a subset of the DASD array segments is selected for free space collection and DASD tracks in the segments are read and moved into the part of the memory segment buffer used to collect live tracks from the free space collection process. These "live" logical tracks are rewritten back to DASD when the buffer is full. As a result, space is freed on the DASDs. The freed space is returned to a pool of empty segments that are available for data storage.

Figure 3:
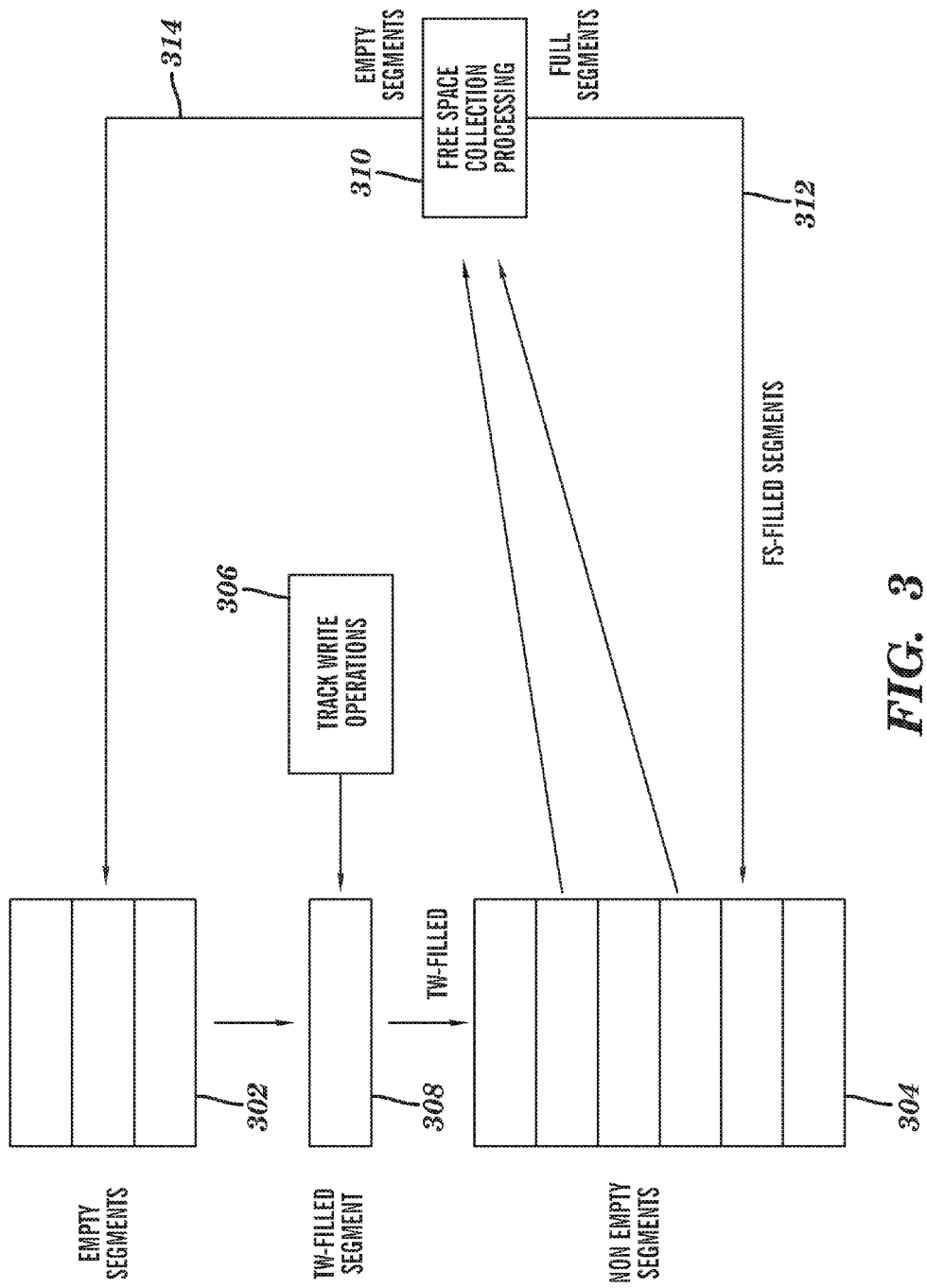
FIG. 3 is a block diagram representation of the free space collection process performed by the computer server illustrated in FIG. 1.

The storage area in the LSA storage system can be considered as a collection of segments whose configuration changes from filled to empty and back again. FIG. 3 illustrates this configuration. The storage area in the DASD array 120 is organized into segments. These segments may be completely empty (as represented in FIG. 3 as a pool or queue of empty segments 302) or may contain a mixture of valid data and invalid data tracks (represented in FIG. 3 as the pool of non-empty segments 304). The control unit program 129 may use track write operations to completely fill one segment's worth of data in the memory segment buffer. Then the control unit program 129 may transfer contents of the memory segment buffer to the next available empty DASD segment. This processing is represented in FIG. 3 by an empty DASD segment receiving one segment's worth of track write operations 306 to become a track-write-filled (TW-filled) segment 308. The TW-filled segment thereby joins the ranks of the non-empty segments. Free space collection processing 310 therefore is understood as collecting partially-filled, non-empty segments 304 and creating both completely filled segments as designated by the free space filled (FS-filled) segments path 312 and segments completely emptied as designated by the empty segments path 314.

The object of free space collecting a segment is to acquire some free space. In time, the free space acquired is taken away again by track writes which result in further invalidation in other segments. When a segment is free space collected, it contributes its empty space to the pool of free space available for track writes and it contributes its still-valid tracks to the pool of tracks which should be written into new segments which will eventually take back the contributed free space.

In accordance with an embodiment of the invention, the control unit program 129 may utilize a specific collection metric for free space collection (collection score), the value of which may be calculated, for the TW-filled segments, by determining the sum, across tracks in the segment, of the amount of time over a predetermined period of time during which the track has been invalid. In an embodiment, the predetermined period of time may be equal to 1 hour. The higher the collection score the better a segment is for free space collection.

FIGS. 4-7 are flow diagrams that illustrate the processing steps performed by the control unit program 129 in managing free space collection in accordance with an illustrative embodiment. In the course of developing the invention, the inventors found that the probability of invalidating a given track of data is highest immediately after it is written, but falls off gradually afterward. In accordance with an embodiment of the invention, the control unit program 129 may classify all segments eligible for free space collection into two groups with different collection behavior. The first group may include segments that have predominantly recently invalidated data, while the second group may include segments predominantly containing data tracks whose invalidation duration exceeds a predetermined threshold. This strategy enables the control unit program 129 to avoid excessive movement of valid data. In accordance with an embodiment of the invention, the control unit program 129 may maintain two distinct lists of segments, one for each group. With respect to FIGS. 4-7, a first list refers to a list containing a plurality of segments included in the first group, while a second list refers to a list containing a plurality of segments included in the second group.

Figure 4:
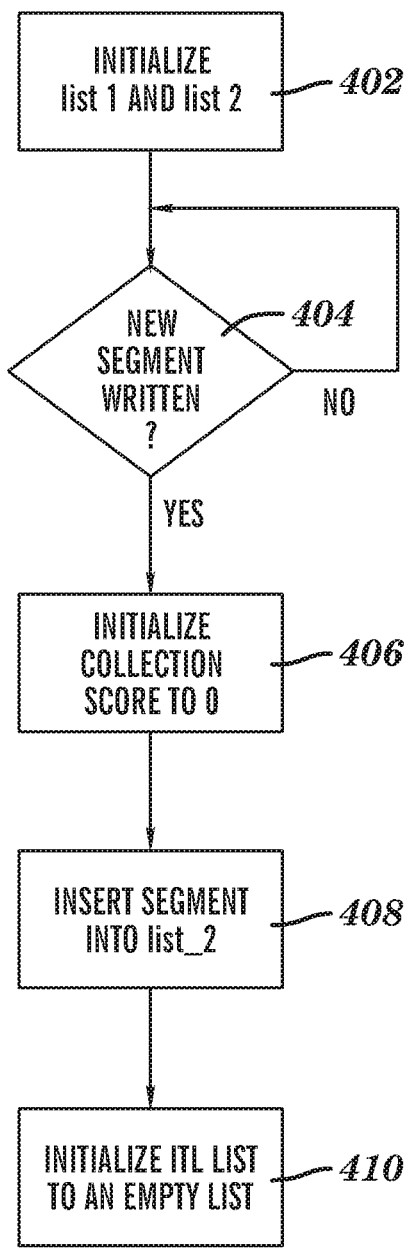
FIG. 4 is a flowchart of a method for managing free space performed by a free space manager program in accordance with an illustrative embodiment.

FIG. 4 is a flowchart of a method for managing free space performed by a free space manager program in accordance with an illustrative embodiment. At 402, free space manager program 130 may initialize each of the first and second lists to an empty list. Each list may be implemented using one or more linked lists, stacks, queues, hash tables, trees, or any other well-known data structures. Some form of sorting may be needed within each list. In an embodiment of the invention, free space manager program 130 may group segments in each list into "buckets" where each bucket represents a ratio of, for example, an estimated collection score value (calculated by collection score generator program 132) to its maximum possible value. In other words, an index of each bucket may be given by the equation:

$$B = nearest\_integer(100 * CS) / CS\_max$$

where B represents an index of a bucket, CS represents an estimated collection score value, and CS_max represents the maximum collection score. In accordance with an embodiment of the invention, control unit program 129, including all components such as free space manager program 130, track invalidation manager program 131, collection score generator program 132, and free space collector program 134 may use a predetermined threshold value to move segments from the one group into another. In an embodiment, the predetermined threshold value may be substantially equal to 1 hour. Thus, in this embodiment of the invention, various component programs of the control unit program 129 may determine CS_max value using: CS_max=60 min*SN, where SN represents the maximum number of tracks in the segment. It should be noted that segments are kept in each list bucket sorted and changing between each bucket index requires less operating overhead than keeping the segments in a list by collection score. Furthermore, each bucket may contain a plurality of segments having the same index (B). Therefore, the list in each bucket can be, for example, but not limited to, a first-in, first-out (FIFO) data structure or queue. Each FIFO list has a "tail" where segments (or actually segment names) enter and a "head" where segments are removed. In an alternative embodiment, the first and second lists may be implemented as self-balanced binary trees.

Referring back to FIG. 4, at 404 free space manager program 130 waits until it receives a signal indicating that a new segment has been written to the DASD array 120 then, at 406, free space manager 130 may initialize the collection score value corresponding to the newly written segment to 0. In an embodiment, the collection score value may be kept within each segment as metadata. At 408, free space manager program 130 may place the newly written segment into the second list. It should be noted that since the newly written segment contains only valid data, the collection score value for this segment is equal to zero. Therefore, free space manager program 130 may place the segment at the bottom of the second list; more specifically the segment will be placed into the bucket having a zero index. In an embodiment of the invention, the metadata for each segment may contain an additional list—an invalidated tracks list (ITL). Control unit program 129 may use the ITL to keep a record of recently invalidated tracks within each segment. The ITL list may be implemented using one or more linked lists, stacks, queues, or any other well-known data structures. At 410, free space manager program 130 may initialize an ITL list for the newly written segment to an empty list.

Figure 5:
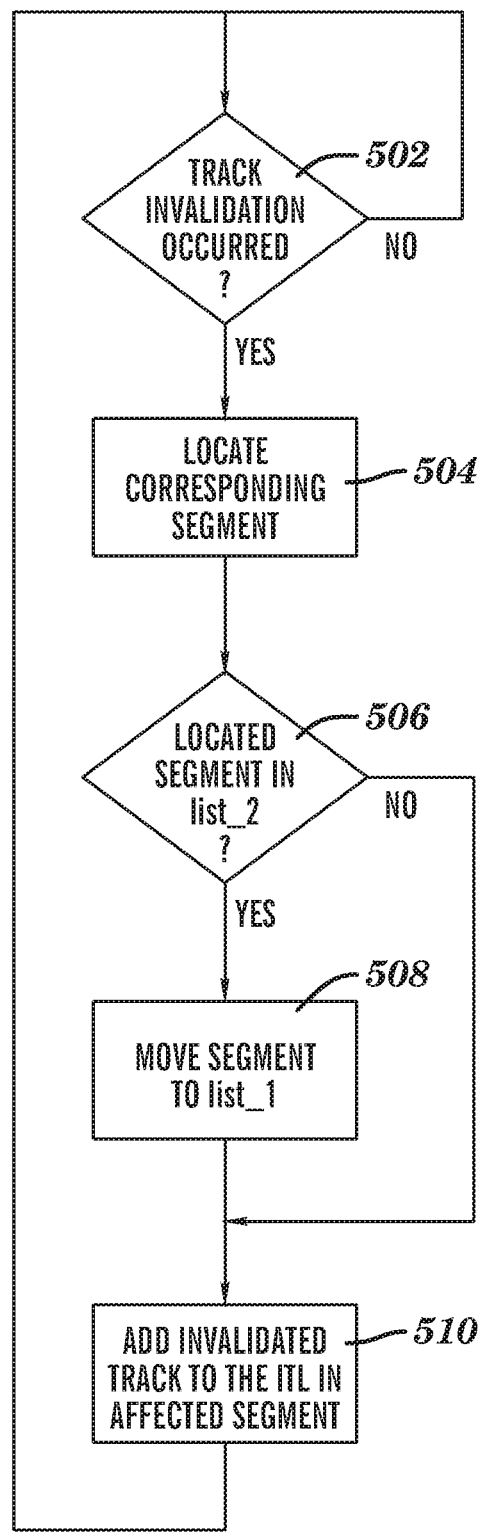
FIG. 5 is a flowchart of a method for controlling data track invalidation performed by a track invalidation manager program in accordance with an illustrative embodiment.

FIG. 5 is a flowchart of a method for controlling data track invalidation performed by track invalidation manager program 131 in accordance with an illustrative embodiment. Track invalidation manager 131 may be, for example, a program component of the control unit program 129 for controlling data track invalidation process. At 502 track invalidation manager program 131 may wait until it receives a signal indicating that the invalidation of a track has occurred. For example, in an embodiment of the present invention suppose that controller program 212 has modified a track of data from the DASD array 120. Controller program 212 may simply place the modified track into the write buffer 228 to be processed with other incoming data. The old data track remains at its present location in an array segment so that parity information does not require updating. However, controller program 212 may replace the physical address of the old track in LSA directory 216 with its new location, thus invalidating the old data. According to an embodiment of the invention, subsequently, controller program 212 may send a control signal to the track invalidation manager program 131 indicating the most recent invalidation. In response to receiving the signal, at 504, track invalidation manager program 131 may determine where in the LSA system the affected segment is located, either in non-volatile LSA data cache 218 or in DASD array 120 using, for example, LSA directory 216. At 506, track invalidation manager program 131 determines whether the affected segment belongs to the first or second lists. If track invalidation manager program 131 finds the affected segment in the second list (decision 506, yes branch), at 508, track invalidation manager program 131 may logically move the affected segment to the first list. In other words, the affected segment joins the ranks of segments that have recently invalidated data. It should be noted that track invalidation manager program 131 may place the affected segment into the corresponding bucket of the first list according to a ratio of the segment's estimated collection score value to collection score's maximum possible value. Subsequently to moving the affected segment to the first list or if the affected segment has belonged to the second list already (decision 506, no branch), track invalidation manager program 131, at 510, may add the recently invalidated track to the ITL corresponding to the affected segment. Next, track invalidation manager program 131 may return to 502 and wait for next track invalidation control signal.

Figure 6:
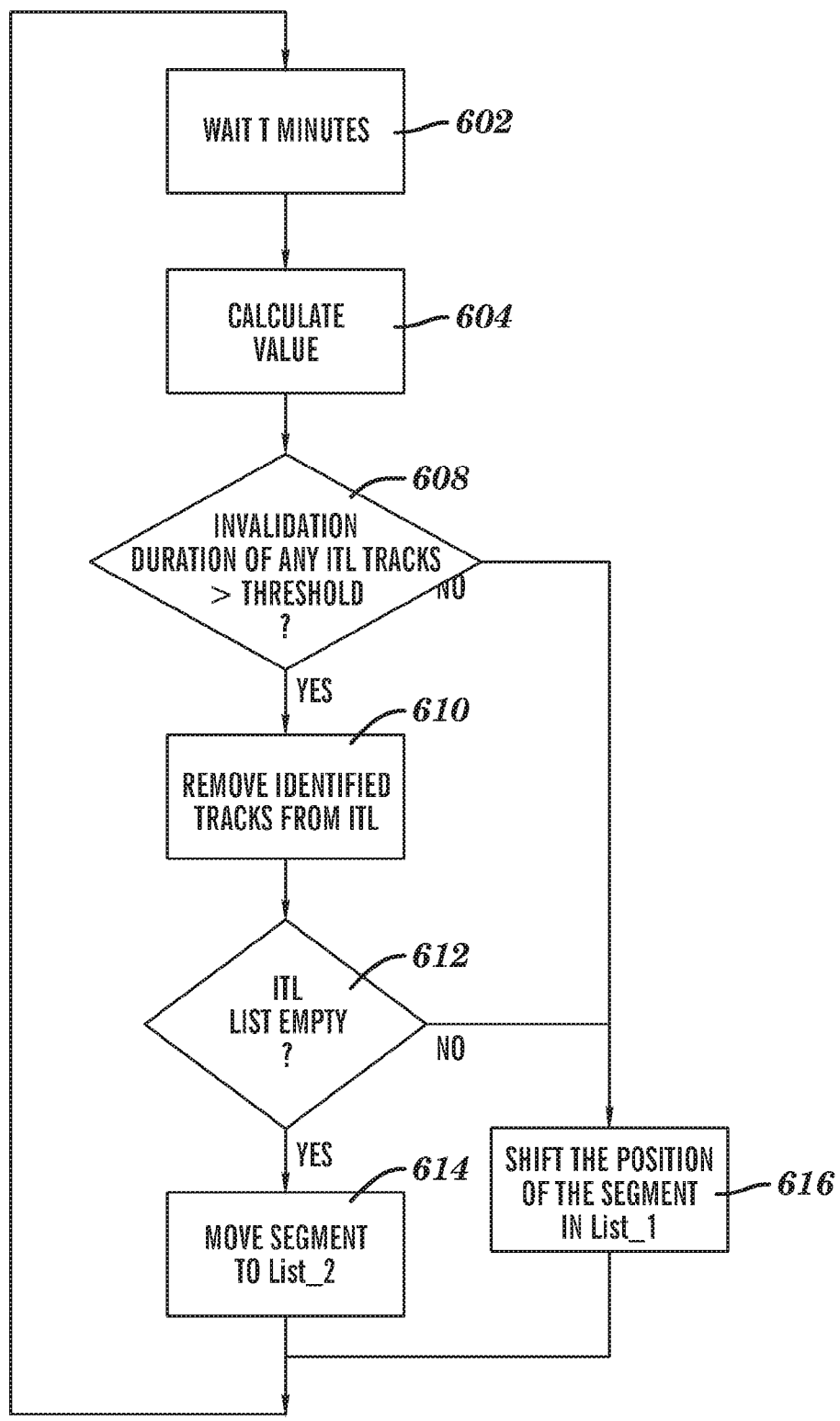
FIG. 6 is a flowchart of a method for generating a collection score value performed by a collection score generator program in accordance with an illustrative embodiment.

FIG. 6 is a flowchart of a method for generating a collection score value performed by collection score generator program 132 in accordance with an illustrative embodiment. In accordance with an embodiment of the present invention, the collection score value represents a sum, across tracks in the segment, of the amount of time over a predetermined period of time during which the track has been invalid due to a more recent copy being written in a different segment. Assume for illustrative purposes that TW-filled segment 308 contains ten tracks of equal size, further assume that first five tracks contain valid data, tracks six and seven have been invalid for 90 minutes and 61 minutes, respectively, and tracks eight through ten have been invalid for 1, 36, and 59 minutes, respectively. In this scenario, Collection score value=1+36+59+2*60=216

It should be noted that values 90, 61, 1, 36, and 59 represent invalidation duration values corresponding to tracks six through ten. In an embodiment of the invention, the invalidation duration value for a given invalidated track might be determined by comparing a current time with a time stamp value associated with the given invalidated track when it is placed in the ITL list. It is contemplated that the invalidation duration values that exceed a predetermined threshold value equally affect the collection score value. In an embodiment of the present invention, all invalidation duration values exceeding the predetermined threshold value, for calculation purposes, may be equal to the predetermined threshold value. Assuming that the predetermined threshold value is equal to 60 minutes, the collection score value calculated above represents a cumulative sum of a plurality of invalidation duration values corresponding to a plurality of invalidated tracks within the exemplary TW-filled segment 308. It should be noted that in the example presented above tracks one through five contain valid data and the invalidation duration values corresponding to those tracks are equal to zero.

Depending on a size of LSA, an alternative method of calculating the collection score value may be used. In some implementations it may be more efficient to calculate an estimated collection score value. For example, an alternative method of calculating the collection score value may take advantage of the fact the collection score value does not change unless there is at least one track that became invalid during the predetermined period of time. If, for example, there are X such tracks, then the collection score value increases at a rate of X per unit of time. Hence, according to an embodiment of the present invention, an estimated collection score value may be calculated by periodically checking a segment that contains recently invalidated data and by calculating a cumulative T*X value, where X represents a number of tracks in the ITL list and T represents a waiting period between collection score calculation operations.

In an embodiment of the present invention, collection score generator program 132 may periodically generate the estimated collection score value for substantially all segments in the first list. At 602, collection score generator 132 may wait a predetermined wait period. In an embodiment, the predetermined wait period (T) may be equal to approximately 5 minutes. At 604, the collection score generator program 132 may increase the current estimated collection score value for a given segment by the value equal to the product of T and X, where X represents a number of tracks in the ITL list and T represents duration of the predetermined wait period.

Referring back to FIG. 6, at 608, collection score generator program 132 may evaluate the ITL list for the processed segment in the first list to determine whether the invalidation duration of any tracks in the ITL exceeds the predetermined time threshold. In response to identifying one or more tracks in the ITL list that meet the condition in 608, collection score generator 132 may remove the identified tracks from the ITL list at 610. At 612, the collection score generator 612 may determine whether after 610 the ITL list still contains any tracks. In response to determining that one or more tracks remain in the ITL for the processed segment (decision 612, no branch), at 616, collection score generator program 132 may shift the position of the processed segment in the first list based on the fresh value of the collection score. As previously indicated, segments may be kept in the first list bucket sorted, where each bucket represents a ratio of the collection score value to its maximum possible value. Therefore, collection score generator 132 may logically move the given segment into the bucket that corresponds to the newly calculated value of the collection score. Otherwise, if the invalidation duration of all invalidated tracks in this segment exceeds the threshold and the ITL list is empty (decision 612, yes branch), collection score generator 132 may move the segment into the second list. Subsequently, collection score generator program 132 may return back to 602.

Figure 7:
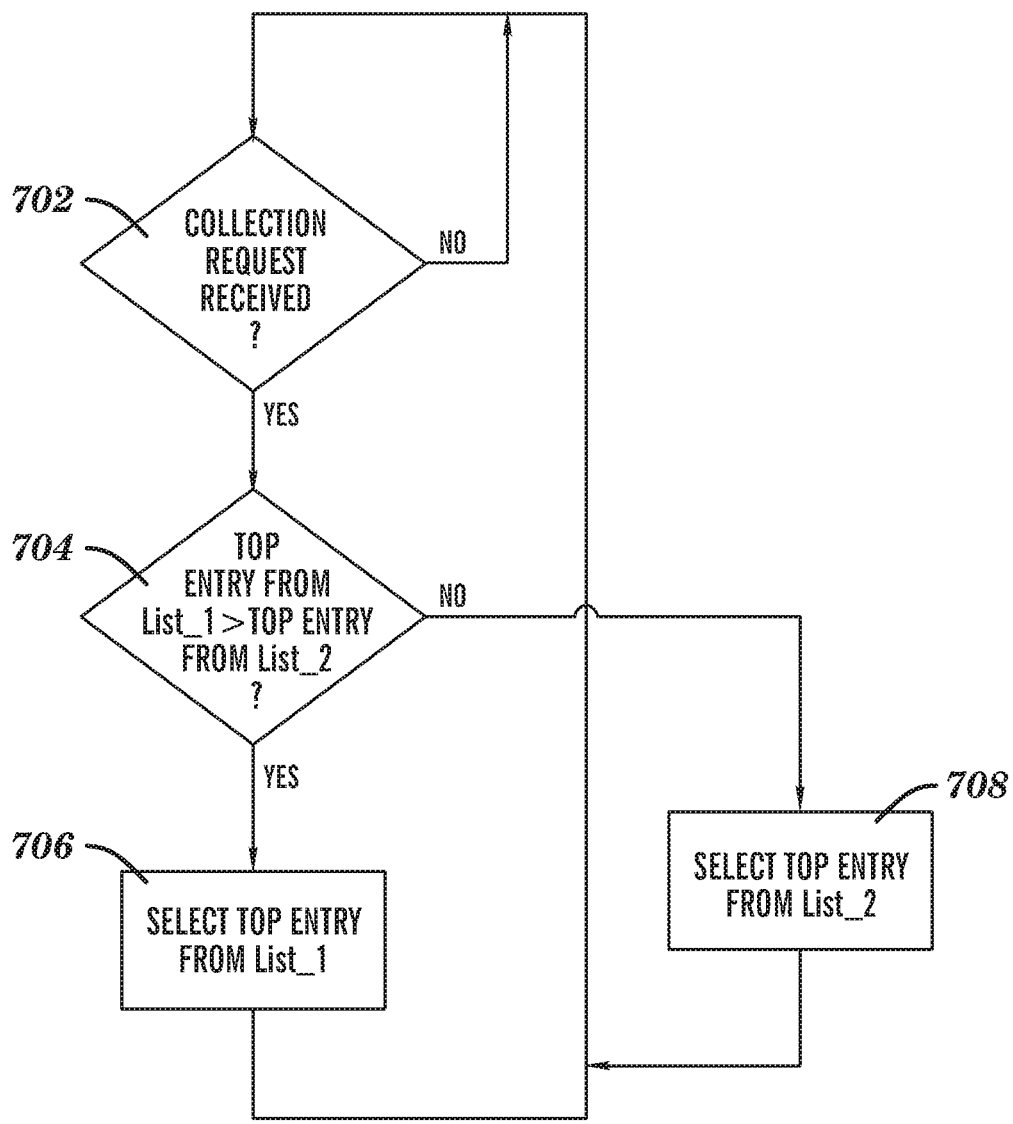
FIG. 7 is a flowchart of a method for controlling free space collection performed by a free space collector program in accordance with an illustrative embodiment.

FIG. 7 is a flowchart of a method for controlling free space collection performed by free space collector program 134 in accordance with an illustrative embodiment. Free space collector program 134 may be, for example, a computer program or program component for controlling free space collection in DASD array 120. At 702, free space collector program 134 may wait for a collection request signal. In an embodiment, the collection request signal may be sent by a different component of the control unit program 129 (for example, controller program 212) when additional empty segments are needed. At 704, free space collector program 134 may perform a comparison of the first and second lists. In an embodiment, the comparison may be carried out for the occupied buckets having the highest index in each list. In other words, free space collector program 134 may scan each list from top to bottom until it detects an occupied bucket. If free space collector program 134 determines that the identified occupied bucket in the first list has a greater index than the identified occupied bucket in the second list (decision 704, yes branch), free space collector program 134, at 706, may select a segment from the identified occupied bucket in the first list for collection. Otherwise (decision 704, no branch), free space collector program 134 may select a segment from the identified occupied bucket in the second list for collection. Thus, in response to receiving the collection request signal, the free space collector program 134 may select segments for processing based on a highest collection score value from either list.

In summary, the free space collection described herein defers collection of new segments due to the higher likelihood of invalidation, while older segments are allowed to remain stable if no further invalidation occurs. Advantageously, all segments are considered for free space collection if needed, including segments that have not been located in the storage system for the selected threshold value, given that those segments have substantial amount of the invalid data. Also, this method does not have any run-time parameters which need calculating and altering during the free space collection process and is therefore simple to implement for an unknown workload or utilization of the segments.

Figure 8:
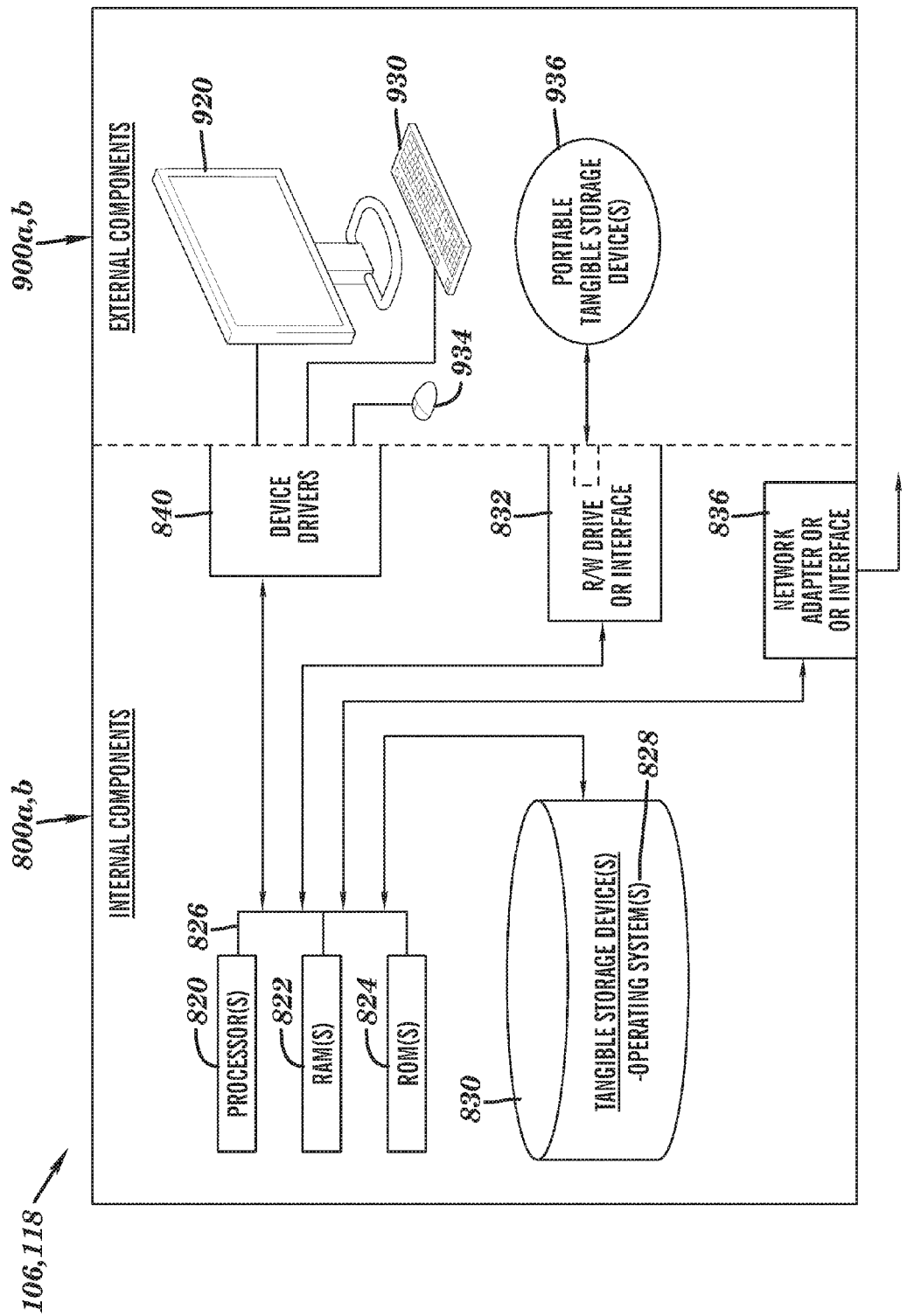
FIG. 8 is a block diagram of internal and external components of each of the computers of FIG. 1.

FIG. 8 is a block diagram of internal and external components of each of the computers of FIG. 1. Computers 106 and 118 include respective sets of internal components 800a, b and external components 900a, b. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, control unit program 129, including free space manager program 130, track invalidation manager program 131, collection score generator program 132, and free space collector program 134 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Control unit program 129, which includes various components such as free space manager program 130, track invalidation manager program 131, collection score generator program 132, and free space collector program 134 can be stored on one or more of the portable computer-readable tangible storage devices 936, read via R/W drive or interface 832 and loaded into one or more computer-readable tangible storage devices 830.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring back to FIG. 8, each set of internal components 800*a, b* also includes a network adapter or interface 836 such as a TCP/IP adapter card. Control unit program 129 can be downloaded to sever computer 106 from an external computer via a network (for example, the Internet, a local area network or other, wide area network) and network adapter or interface 836. From the network adapter or interface 836, control unit program 129 is loaded into one or more computer-readable tangible storage devices 830. The network may comprise copper wires, optical fibers, wireless transmission, routers, firewalls, switches, gateway computers and/or edge servers.

Each of the sets of external components 900*a, b* include a computer display monitor 920, a keyboard 930, and a computer mouse 934. Each set of internal components 800*a, b* also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for free space collection in a log structured storage system having segments, each segment including a plurality of tracks, the method comprising:
   in response to initially writing data to all the tracks of an empty one of the segments, adding an entry for the one segment to a stable segment list, the entry including a collection score value of zero;
   in response to invalidating a track in one of the segments to which data has been written:
      adding an entry for the invalidated track to an invalidated track list (ITL); and
      removing the segment from the stable segment list, if it is in the stable segment list, and adding an entry for the segment to a recently invalidated segment list, if such an entry is not in the recently invalidated segment list;
   periodically determining a collection score value for each segment with a track in the ITL by calculating a cumulative sum of invalidation duration values corresponding to the durations that tracks belonging to the segment have remained on the ITL;
   in response to determining that the collection score value for a track in the ITL is greater than a predetermined collection score threshold value, setting the collection score to the collection score threshold value and removing the track from the ITL;
   in response to determining that a segment in the recently invalidated segment list has no associated tracks in the ITL, moving the segment from the recently invalidated segment list to the stable segment list;
   in response to receiving a request to collect free space in the log structured storage system, selecting for free space collection the segment in the recently invalidated segment list having the largest cumulative sum of invalidation duration values if this cumulative sum is larger than the cumulative sum of invalidation duration values for the segment in the stable segment list having the largest cumulative sum of invalidation duration values, otherwise, selecting for free space collection the segment in the stable segment list having the largest cumulative sum of invalidation duration values; and
   emptying the selected segments, whereby the emptied segments become available for the writing of data to their tracks.

2. The method of claim 1, wherein the predetermined collection score threshold value is equal to one hour.

3. The method of claim 1, wherein determining the collection score value comprises calculating an estimated collection score value for at least one of the plurality of segments and wherein selecting the one or more segments comprises selecting the one or more segments from among the plurality of segments for free space collection based on the determined estimated collection score value.

* * * * *